(12) United States Patent
Southall et al.

(10) Patent No.: US 7,321,669 B2
(45) Date of Patent: Jan. 22, 2008

(54) METHOD AND APPARATUS FOR REFINING TARGET POSITION AND SIZE ESTIMATES USING IMAGE AND DEPTH DATA

(75) Inventors: John Benjamin Southall, Philadelphia, PA (US); David Hirvonen, Portland, OR (US); Theodore Armand Camus, Mount Laurel, NJ (US)

(73) Assignees: Sarnoff Corporation, Princeton, NJ (US); Ford Motor Company, Dearborn, MI (US)

( * ) Notice: Subject to any disclaimer, the term of this patent is extended or adjusted under 35 U.S.C. 154(b) by 764 days.

(21) Appl. No.: 10/617,231

(22) Filed: Jul. 10, 2003

(65) Prior Publication Data

US 2005/0013465 A1    Jan. 20, 2005

(51) Int. Cl.
    *G06K 9/00*    (2006.01)
(52) U.S. Cl. ..................................... 382/106
(58) Field of Classification Search ........ 382/103–108; 340/904, 961; 701/301
    See application file for complete search history.

(56) References Cited

U.S. PATENT DOCUMENTS

| | | | |
|---|---|---|---|
| 4,823,394 A * | 4/1989 | Berkin et al. ............... | 382/145 |
| 5,452,367 A * | 9/1995 | Bick et al. .................. | 382/128 |
| 5,742,141 A | 4/1998 | Czekaj ........................ | 318/587 |
| 5,926,126 A | 7/1999 | Engelman .................... | 342/70 |
| 6,052,124 A * | 4/2000 | Stein et al. .................. | 345/419 |
| 6,360,003 B1 * | 3/2002 | Doi et al. .................... | 382/107 |
| 6,442,484 B1 | 8/2002 | Miller et al. ................ | 701/301 |
| 6,452,535 B1 | 9/2002 | Rao et al. .................... | 342/72 |
| 6,480,102 B1 | 11/2002 | Miller et al. ................. | 340/70 |
| 6,498,972 B1 | 12/2002 | Rao et al. .................... | 701/45 |
| 6,674,894 B1 * | 1/2004 | Parker et al. ............... | 382/154 |
| 7,003,134 B1 * | 2/2006 | Covell et al. ............... | 382/103 |

OTHER PUBLICATIONS

Constructing virtual worlds using dense stereo□□Narayanan, P.J.; Rander, P.W.; Kanade, T.;□□Computer Vision, 1998. Sixth International Conference on□□Jan. 4-7, 1998 pp. 3-10.*

* cited by examiner

*Primary Examiner*—Bhavesh M Mehta
*Assistant Examiner*—Hadi Akhavannik
(74) *Attorney, Agent, or Firm*—Lowenstein Sandler PC

(57) ABSTRACT

A vehicle vision system that uses a depth map, image intensity data, and system calibration parameter to determine a target's dimensions and relative position. Initial target boundary information is projected onto the depth map and onto the image intensity. A visibility analysis determines whether the rear of a target is within the system's field of view. If so, the mapped image boundary is analyzed to determine an upper boundary of the target. Then, vertical image edges of the mapped image boundary are found by searching for a strongest pair of vertical image edges that are located at about the same depth. Then, the bottom of the mapped image boundary is found (or assumed from calibration parameters). Then, the target's position is found by an averaging technique. The height and width of the target are then computed.

23 Claims, 7 Drawing Sheets

METHOD AND APPARATUS FOR REFINING TARGET POSITION AND SIZE ESTIMATES USING IMAGE AND DEPTH DATA

CROSS-REFERENCE TO RELATED APPLICATIONS

This application contains subject matter that is related to the subject matter described in U.S. patent application Ser. No. 10/461,699, filed Jun. 13, 2003, entitled "Vehicular Vision System" (Now U.S. Pat. No. 7,263,209), which is incorporated herein by reference in its entirety.

BACKGROUND OF THE INVENTION

1. Field of the Invention

The present invention relates to vehicle vision systems. More particularly, the present invention relates to improving position and size estimates of nearby vehicles.

2. Description of the Related Art

Vehicle vision systems include a sensor or sensors that image scenes proximate a vehicle, e.g., in front or behind the vehicle. A vehicle having a vision system will be referred to herein as the host vehicle. A sensor for a vision system may include a radar system, an infrared sensor, an optical system, and the like. In any event, the sensor produces rudimentary image data of the scene around the host vehicle. Subsequently, image-processing techniques are applied to the rudimentary image data to identify objects that are within the sensor's field of view. Since vehicle vision systems are often used in collision avoidance systems, an object within the sensor's field of view will be referred to as a target.

While vehicle vision systems can identify when a target is in front of a host vehicle, such systems usually do not provide accurate information about either the target or its movement. As such, a driver of a host vehicle may be warned of a target, or the host vehicle may automatically take evasive action, yet the target may represent no danger.

To help identify when a target is a danger, it would be beneficial to accurately know both the size and the position of the target. To do so, the edges of the target must be known. Such edge information could then be used to accurately determine the target's height, width, and position. Accurate height, width, and position information would be very useful in differentiating between different types of targets, such as sedans, SUVs, and trucks, and in accurately discriminating between collisions and near misses. Therefore, there is a need in the art for a method and apparatus that provides accurate information regarding a target's size and position. Such methods and apparatus would be particularly beneficial in vehicle vision systems in general, and in collision avoidance systems in particular.

SUMMARY OF THE INVENTION

The principles of the present invention provide for a method and apparatus of accurately identifying edges of a nearby target using image intensity and depth information. The principles of the present invention further provide for vehicle vision systems and for collision avoidance systems that use identified edges of nearby targets to provide improved target size estimates and/or improved target position information.

A method that is in accord with the principles of the present invention uses image intensity data (such as from stereo cameras), a depth map that is aligned with the image intensity data, system (camera) calibration parameters, and a target's initial boundary information to provide more accurate information about the target. The target's initial boundary information, which represents an estimate of the target's outline and position, is projected onto the depth map and onto the image intensity data. This maps the approximate spatial position of the target onto the depth map and intensity data. A visibility analysis is then performed to determine whether the rear face of a target is within the system's field of view. If not, the initial boundary information is used to refine the target's position information (as subsequently described) using the depth map and the image intensity data. However, if the rear face is within the system's field of view, the image intensity data, the depth map, and the system calibration parameters are used to improve the target's boundary information and position information.

First, the bottom image intensity data row that is mapped by the initial boundary information is analyzed to determine whether a certain (predetermined) percentage of its depth measurements fall within a specified region around the target's depth. Then, each consecutive row (moving up the image) is subsequently analyzed in the same way. Each row that satisfies the required criterion is stored as the "last good row," thus replacing the previously identified "last good row." After the "last good row" has been identified, the next higher row will not meet the required criterion and the row search then terminates. The target's boundary information is adjusted to reflect the newly determined upper boundary (top) of the vehicle, i.e. the "last good row".

Next, the procedure searches the image intensity data for vertical image edges around the target's depth. The procedure beneficially searches around the mapped boundary information for the strongest pair of vertical image edges, with the strength of a pair being defined as the sum of its edge strengths multiplied by a (predetermined) penalty term that reflects the difference in depth (from the depth map). The depth penalty helps ensure that the two vertical image edges (sides) belong to the same target. Preferably, identifying vertical image edges are subject to three constraints: vertical image edges that are "too strong" are rejected as being likely to correspond to contrast between lane markings and the road surface; a minimum strength for the vertical edge pair must be satisfied; and the vertical image edges must be at least a minimum distance apart. If no suitable vertical image edge pair can be found, then the boundary information is unaltered. But, if a suitable vertical image edge pair is identified, then the vertical edge positions are used to refine the target's boundary information.

The procedure continues by searching for a bottom target edge. The procedure searches the image intensity data for a horizontal image edge that corresponds to a dark-to-light transition between the target's shadow and the road surface. If a suitable bottom target edge is located, the target's boundary information is updated to reflect the found lower edge. But, if a bottom target edge is not found, the target's boundary information is set such that its lower edge corresponds to the lowest image row within the system's field of view at the initial target detection depth. That lowest image row is found from the system calibration parameters.

The refined boundary information is then used to refine the position of the target. The depth values within the refined target boundary information are sorted into histogram bins. Then, a refined measurement of the target's position is calculated, beneficially by determining the mean of 5 histogram bins around the median depth value of the histogram. This new depth value, the camera calibration parameters, and the refined boundary information are used to re-calculate the position of the target. The recalculated target position, together with the height and width of the target's edges from the boundary information, which are all in image pixel format, are then mapped to physical dimensions (usually meters).

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
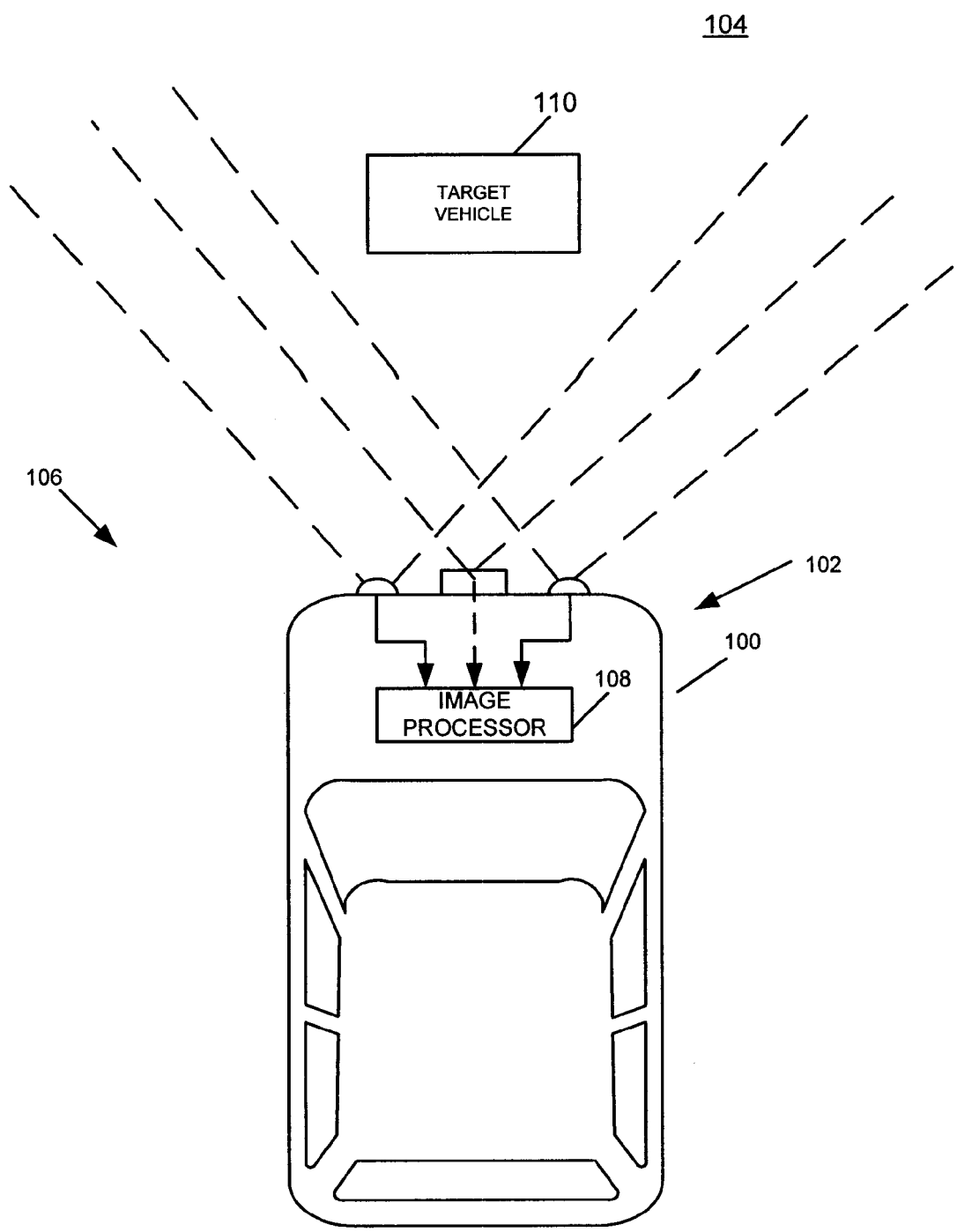
FIG. 1 depicts a schematic view of a host vehicle having a vision system that is suitable for practicing the present invention.

FIG. 1 depicts a host vehicle 100 having a vision system 102 that images a scene 104 that is in front of the host vehicle 100. Other applications of the vision system 102 may image scenes that are behind or to the side of the host vehicle 100. The vision system 102 includes a sensor array 106 that is coupled to an image processor 108. The sensor array 106 has a field of view that includes a target 110. In practice, the sensor array's field of view may be ±12 meters horizontally (e.g., approximately 3 traffic lanes), ±3 meters vertically, and approximately 40 meters deep.

Figure 2:
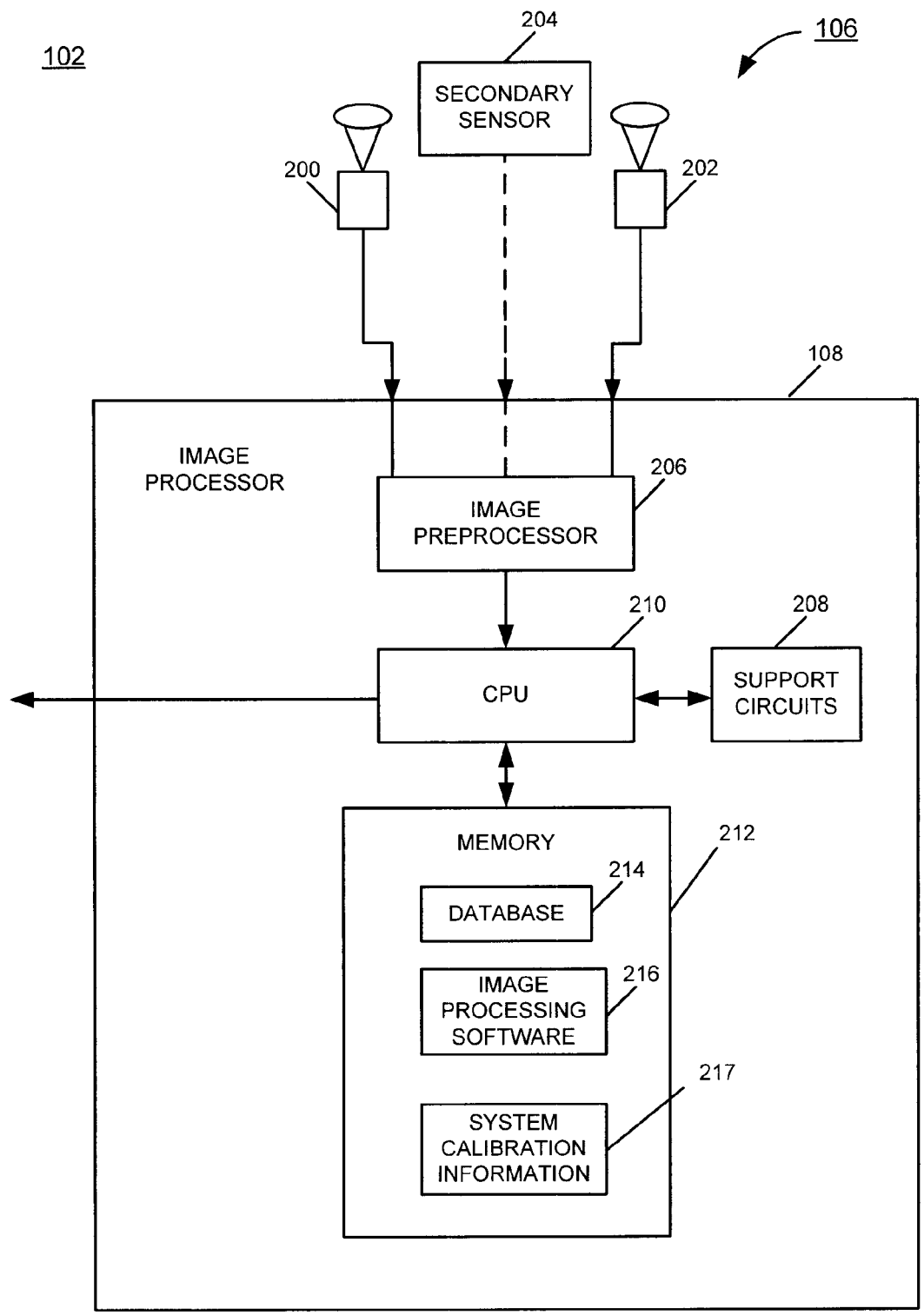
FIG. 2 depicts hardware used in the vision system of FIG. 1.

Referring now to FIG. 2, the sensor array 106 beneficially includes a pair of optical cameras 200 and 202 and a radar-based secondary sensor 204. The cameras 200 and 202 are physically separated at fixed locations to enable stereographic imaging. While the cameras 200 and 202 will typically operate in the visible wavelengths, the cameras may be augmented with infrared sensors, or, in certain applications, the cameras may operate in the infrared. The secondary sensor 204 could also be a LIDAR transceiver, an infrared range finder, a sonar range finder, and the like. However, radar-based sensors are well known and provide accurate range (depth) information that can be used to augment the images provided by the cameras 200 and 202.

Still referring to FIG. 2, the image processor 108 includes an image preprocessor 206, a central processing unit (CPU) 210, support circuits 208, and memory 212. The image preprocessor 206 generally captures, digitizes and processes the imagery from the cameras 200 and 202. The image preprocessor may include a single chip video processor such as the Acadia I™ by Pyramid Vision Technologies of Princeton, N.J. Additionally, the image processor may capture and process information from the secondary sensor 204.

The image preprocessor 206 outputs are coupled to the CPU 210 that performs and/or directs the various steps required to implement the present invention. The CPU 210 itself may include any of a number of presently available high-speed microcontrollers or microprocessors. The CPU 210 is supported by support circuits 208 that are generally well known in the art. These circuits may include cache, power supplies, clocks, input-output circuitry, and the like.

The memory 212, which is coupled to the CPU 210, stores image processing software routines 216 that are executed by the CPU 210 to facilitate the invention. The memory 212 also stores certain information databases 214 that are useful in producing depth maps and in identifying the target 110. Additionally, the memory 212 stores system calibration information 217 that is obtained during initial calibration of the vision system 102 and its components. Such calibration information may include the height of the cameras 200 and 202, the physical separation of the cameras, and the minimum heights that the cameras can image at various distances. The camera's heights and physical separation are useful in determining image depths (how far an imaged target is in front of the host vehicle 100); while the minimum image heights are related to how high a target must be to be seen. For example, the cameras 200 and 202 will usually be located such that they are unable to image the ground a short distance in front of the host vehicle 100. Although this embodiment is generally described in the context of a series of method steps, the method may be performed in hardware, software, or some combination of hardware and software.

Figure 3:
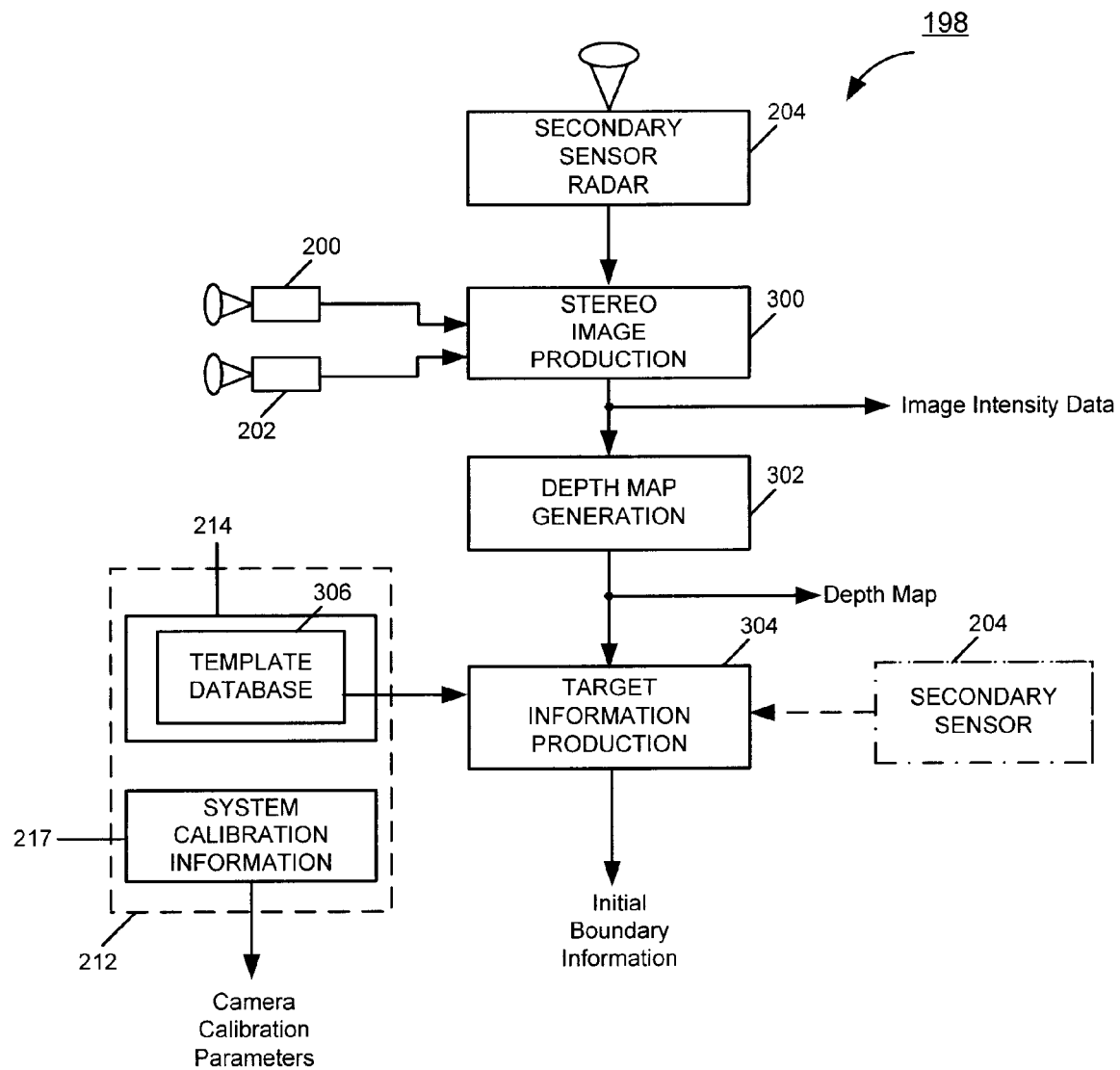
FIG. 3 depicts a functional block diagram of part of the vision system of FIG. 1.

FIG. 3 is a functional block diagram of a processing system 198 that provides image intensity data, a depth map, target information, and system calibration parameters. The cameras 200 and 202 provide stereo imagery to the image preprocess 206 (see FIG. 2). The image preprocessor produces stereo image information 300, possibly by using information from the secondary sensor 204. The stereo image information is made available as image intensity data, which is used as raw data in a number of different steps.

One use of the stereo image information 300 is in generating a depth map 302. The resulting depth map is used to produce target information 304, which represents coarse data about the target. The depth map itself is made available for other purposes, which are subsequently explained. Target information production may make use of information stored in the information databases 214, which specifically includes a target template database 306. In practice, information from the secondary sensor 204 is also useful in producing the target position information. In any event, a subset of the target information is made available as initial boundary information. Furthermore, at least part of the system calibration information 217 is made available as system calibration parameters.

FIGS. 1, 2, and 3 illustrate and explain how a vehicle vision system 102 is implemented and used to produce image intensity data, a depth map, initial boundary information, and system calibration parameters. The vehicle vision system 102 is related to systems that are known to those who are skilled in the applicable arts. U.S. patent application Ser. No. 10/461,699, entitled "Vehicular Vision System" (Now U.S. Pat. No. 7,263,209), by Theodore Armand Camus et al., filed on Jun. 13, 2003, which is hereby incorporated by reference, describes one such system that benefits from the invention described herein. That patent application provides additional processing details that may be useful in understanding the production of image intensity data, the depth map, initial boundary information, and system calibration parameters. However, numerous other systems can provide some or all of that information.

Figure 4:
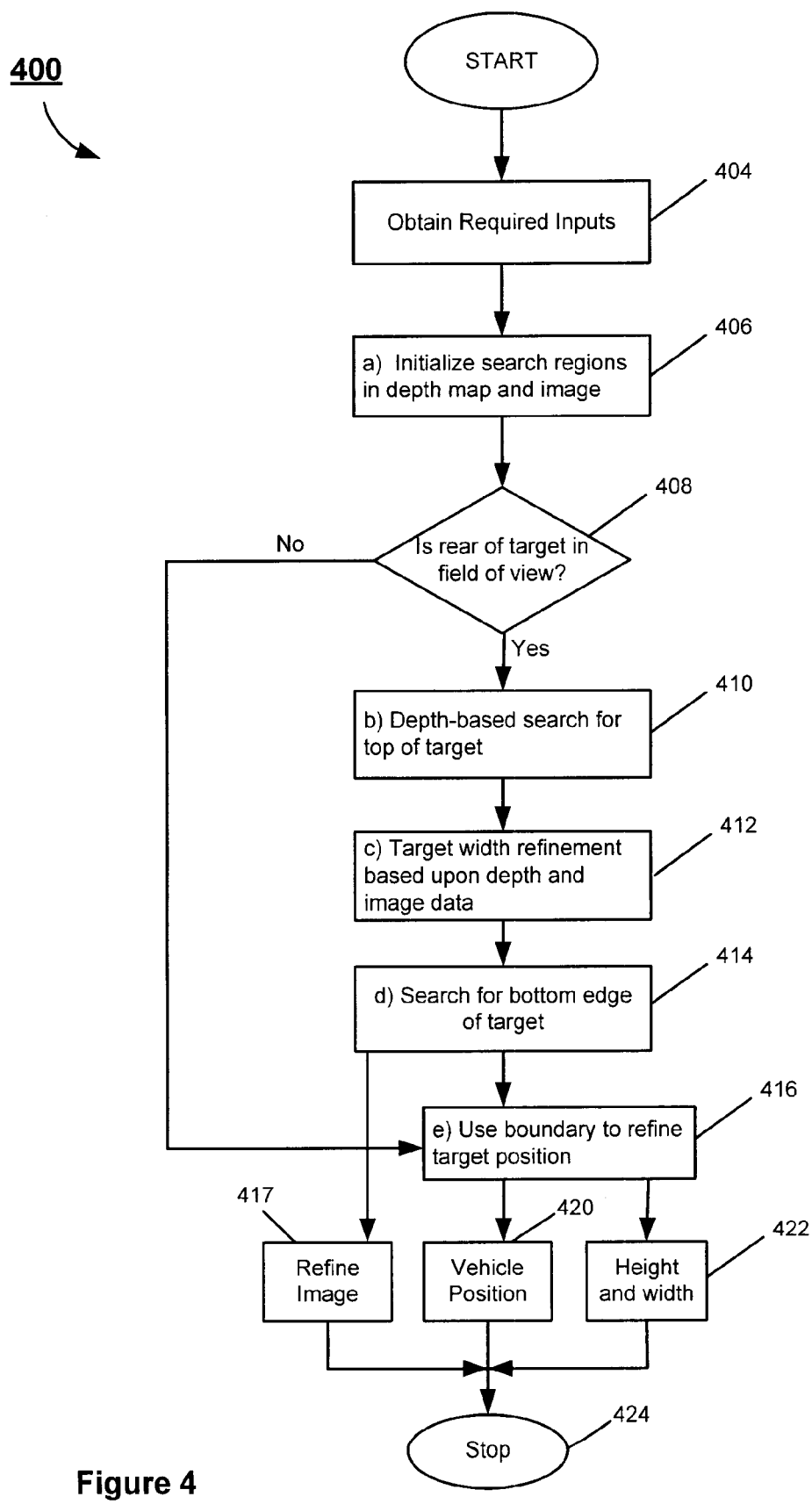
FIG. 4 depicts a flow diagram of a procedure that is in accord with the principles of the present invention.

The image intensity data, depth map, initial boundary information, and system calibration parameters are used in a procedure 400, depicted in FIG. 4, which refines the target information (reference target 110 in FIG. 1). In particular, the procedure 400 improves the target's boundary information, specifically by identifying the target's edges, which enables an improved size estimate and identification of the target 110, as well as more accurate position information.

Referring now to FIG. 4, as shown, the procedure 400 starts at step 402 and proceeds by obtaining required inputs at step 404. Those required inputs include the image intensity data, the depth map, the initial boundary information, and the system calibration parameters. Then, at step 406, the initial boundary information is mapped onto the image intensity data and onto the depth map to initialize the data regions that will be searched. This mapping locates the approximate position of the target in the depth map and in the image intensity data, thus reducing the amount of data that must be processed.

At step 408, a visibility analysis is performed to determine whether the rear face of the target 110 is within the system's field of view. If not, the procedure bypasses a number of subsequent steps (steps 410-416) and advances to step 416, which is described subsequently.

However, if, at step 408, it is determined that the rear face of the target 110 is within the system's field of view, the initial boundary information is improved by finding the top, sides, and bottom of the mapped target in the image intensity data. The resulting refined boundary information includes information related to the height and width of the target 110, which assists in identifying the target and in improving the target's position information.

Figure 5:
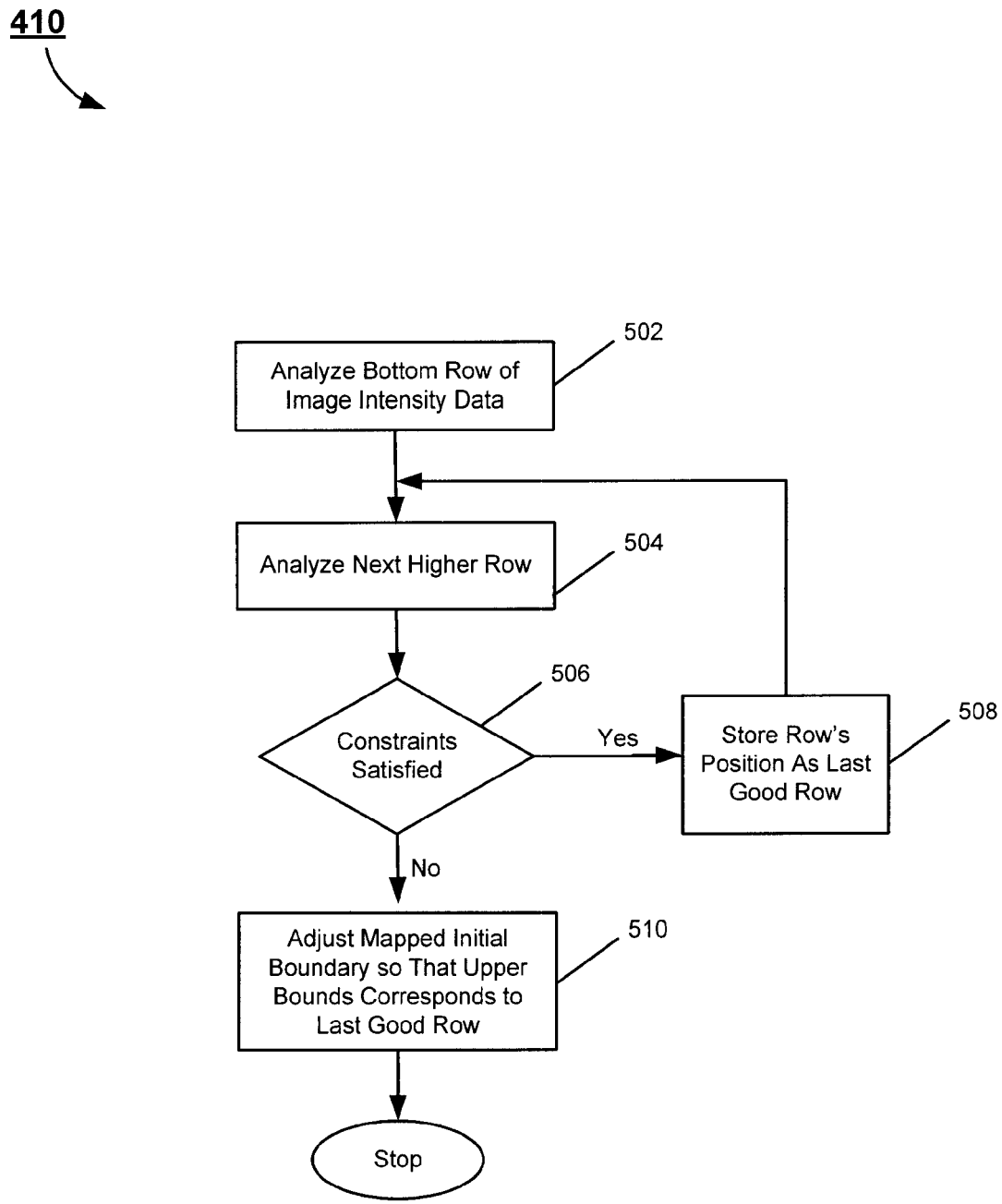
FIG. 5 depicts a flow diagram of the process of determining the top of a target.

Improving the initial boundary information begins at step 410 with a depth-based search for the top of the target 110. Referring now to FIG. 5, the depth-based search of step 410 begins at step 502 by analyzing the bottom row of the image intensity data that is mapped with initial boundary information to determine whether a predetermined percentage of that row's depth measurements (from the depth map) fall within a specified region around the target's depth. Then, at step 504 the next higher row (moving up the image intensity data) is analyzed to determine whether a predetermined percentage of its depth measurements fall within the specified region around the target's depth. Then, at step 506, a determination is made as to whether the row analyzed in step 504 satisfies its constraints. If the answer is affirmative, at step 508 that row's position is stored as the "last good row," overwriting the previously stored "last good row" information and loops back to step 504 to analyze the next higher row. However, if the determination at step 506 is negative, at step 510 the mapped initial boundary information is adjusted to reflect the newly determined upper boundary of the target, i.e. the "last good row," which results in refined boundary information. The procedure then stops at step 512. Thus, the top of the target 110 in the image intensity data is determined.

Figure 6:
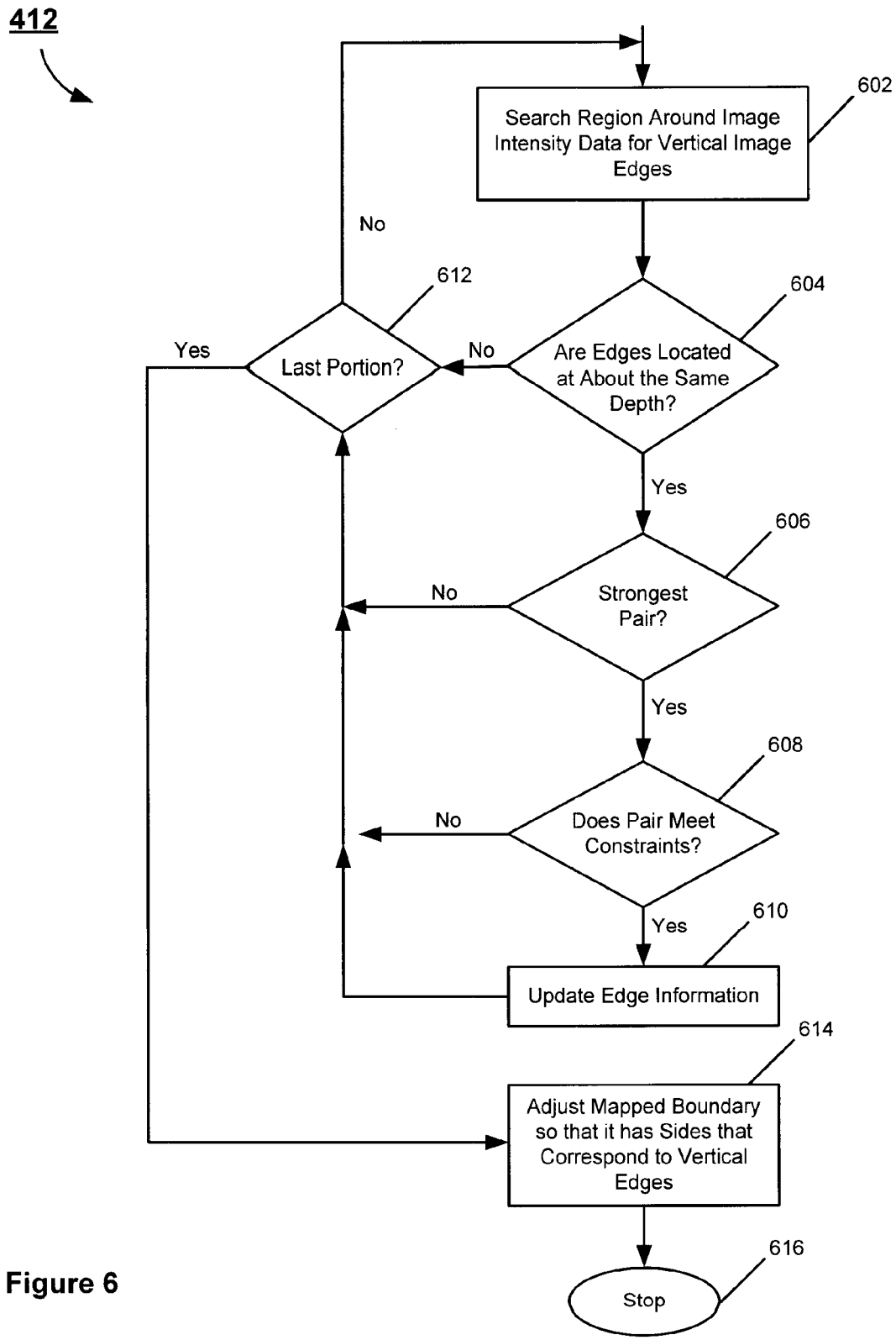
FIG. 6 depicts a flow diagram of the process of determining the sides of a target.

Referring now to FIG. 4, the procedure 400 continues after step 410 by finding the target's width (sides) at step 412. Step 412 beneficially uses the depth map, the image intensity data, and the target depth. Referring now to FIG. 6, step 412 begins at step 602 by searching for vertical image edges (left and right sides) within the image intensity data. Then, at step 604 when an edge is found a determination is made as to whether the vertical image edges are located at about the same depth from the host vehicle 100. If the answer is affirmative, at step 606 a determination is made as to whether the vertical image edges are the "strongest pair" of vertical image edges, with the strength of a pair being defined as the sum of its edge strengths (pixel intensity differences) multiplied by a penalty term that reflects the difference in depth (computed from the depth map) at each edge. The depth penalty ensures that the two vertical image edges belong to the same target. The procedure of step 412 then determines at step 608 if the strongest pair meets predetermined constraints. Those constrains beneficially include determining if the vertical image edges are "too strong," thus likely to correspond to contrasts between lane markings and the road surface. Another beneficial constraint is requiring a minimum strength of the vertical edge pair. This avoids identifying vertical edges that do not exist. If the vertical edge constraints are met, at step 610 the vertical edge information is stored. Another beneficial constraint is to require that the vertical image edges be spaced some minimum distance apart. After step 610, or if the answer is negative in step 608, or if the answer is negative in step 606, or if the answer is negative in step 604, at step 612 a determination is made as to whether the last portion of the region around the mapped image intensity data has been searched. If the answer is negative, a loop is made back to step 602 to continue the search. However, if the answer at step 612 is affirmative, at step 614 the mapped boundary is adjusted so that it has sides that correspond to the vertical edge information stored in step 610. The procedure of step 412 then stops at step 616. If no suitable edge pair is found, then the refined boundary information from step 410 is unaltered.

Figure 7:
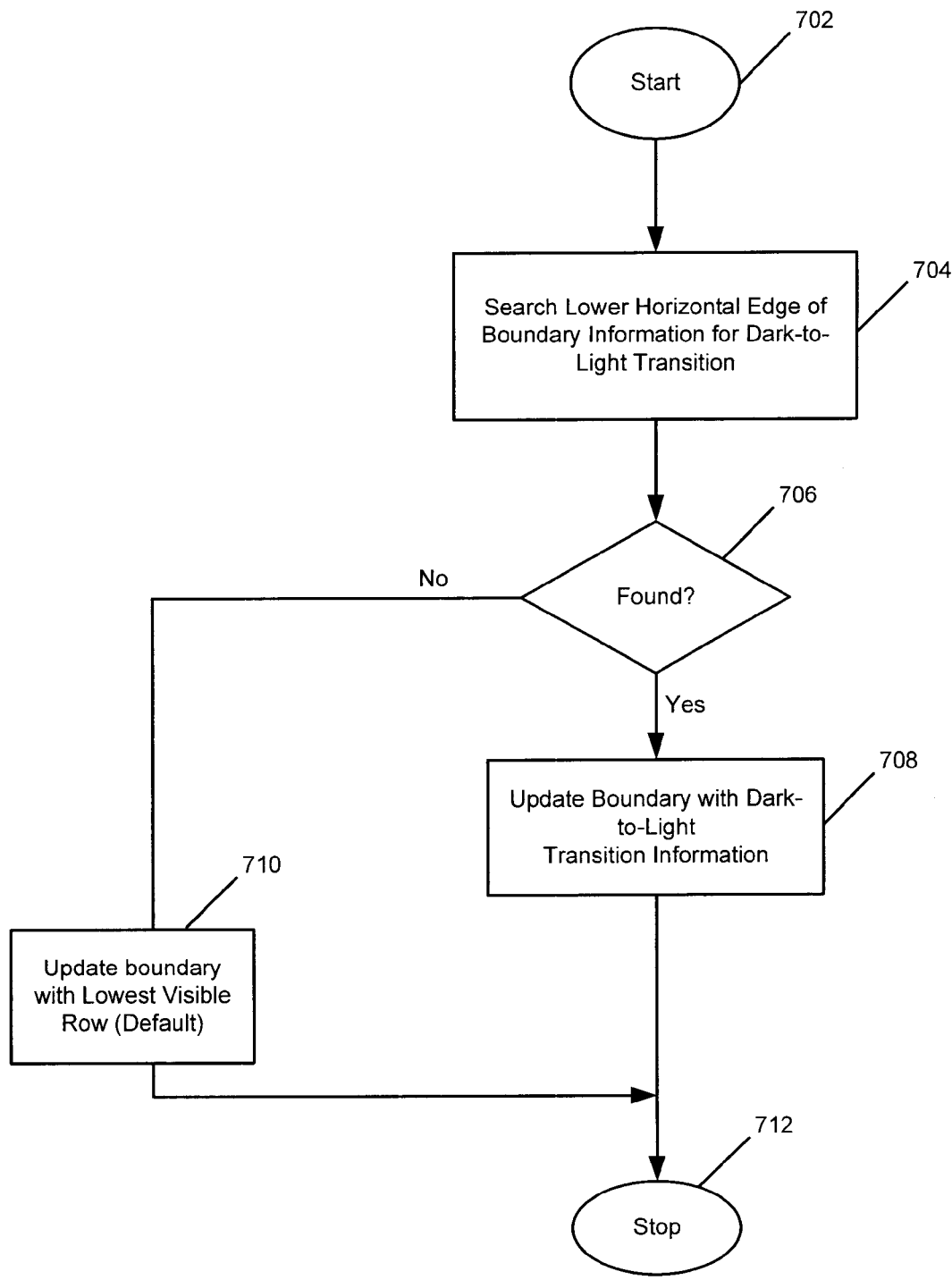
FIG. 7 depicts a flow diagram of the process of determining the bottom of a target.

Then, at step 414, a search is made to identify the target's bottom edge. This process uses the refined boundary information from step 412, the image intensity data, the depth map, and the system calibration parameters. It should be understood that under a wide range of illumination conditions, a target 110 casts a shadow on the road that is darker than the road itself. Referring now to FIG. 7, the procedure for step 414 starts at step 702 and, at step 704, searches the image intensity data near the lower horizontal edge of the (mapped) refined boundary information to find a dark-to-light transition between the shadow and the road surface. If the dark-to-light transition is found, step 706, at step 708 the refined boundary information is updated to reflect the position of the transition. If no such edge is found in step 706, at step 710 the lower edge of the refined boundary information is set at a default value, with that default being the horizontal row image that corresponds to the lowest height that the camera's can image at the depth specified by the target's detection depth. As previously noted the lowest height for each depth is found during system calibration and is stored in the system calibration information database 217 of memory 212. Then at step 712 the procedure 414 stops.

Referring now once again to FIG. 4, after completion of step 414, at step 417 the refined boundary image is made available to the remainder of the vision system 102 and to a subsequent step in the procedure 400. Furthermore, after step 414, or if the rear of the target was not in the field of view in step 408, at step 416, the boundary information (either the refined boundary information from step 416 or the initial boundary information) is used to refine the target's position. This process uses the boundary information and the depth map. The depth map values that are mapped by the boundary information are sorted into a histogram. Then, a refined measurement of the target's depth is calculated as the mean of N bins around the median depth value of the histogram, where N is an integer, e.g., five. This new depth value, together with the system calibration and boundary information, is used to map the position of the target 110.

After step 416, the improved target position information and the target's height and width information are made available to other portions of the vision system 102 at steps 420 and 422, respectively. Then at step 424 the procedure 400 stops.

Regarding step 422, the height and width information of the target 110 can be made available either in pixel units, such as within the image intensity data, or in spatial units. When made available in spatial units a transformation from the pixel-based image intensity data to physical units will be required, a process that will likely use the depth map and the improved target position information.

While the foregoing is directed to embodiments of the present invention, other and further embodiments of the invention may be devised without departing from the basic scope thereof, and the scope thereof is determined by the claims that follow.

The invention claimed is:

1. A method of refining a vision system comprising:
obtaining image intensity data of a field of view and a depth map of objects within the field of view;
determining if the image intensity data and the depth map include information related to a target;
searching for vertical edges of the target in the image intensity data using information in the depth map;
searching for the bottom of the target in the image intensity data using information in the depth map; and
searching for the top of the target in the image intensity data using information in the depth map, which is aligned to the image intensity data, wherein said searching for the top of the target comprises:
(a) searching a row of the depth map data to determine whether a predetermined percentage of that row's depth measurements fall within a specified depth;
(b) storing the position of the row of step (a) if that row has the predetermined percentage of depth measurements that fall within a specified depth;
(c) searching a higher row of the depth map data to determine whether the predetermined percentage of that row's depth measurements fall within a specified depth;
(d) looping to step (b) if the row of step (c) has the predetermined percentage of depth measurements that fall within the specified depth; and
(e) identifying the highest row that has the predetermined percentage of depth measurements that fall within the specified depth as the top of the target.

2. A method according to claim 1, further comprising producing information related to the height and width of the target in the intensity image and depth map data.

3. A method according to claim 2, further comprising refining the depth information the target.

4. A method according to claim 2 wherein the produced height and width information in meters is derived from system calibration parameters.

5. A method according to claim 1 wherein searching for the bottom of the target comprise searching the lower rows of the image intensity data in the region of the detected target to find a dark-to-light transition.

6. A method according to claim 5 wherein the bottom of the target is set at a predetermined position if a dark-to-light transition is not found.

7. A method according to claim 1 further comprising:
searching for the vertical edges by:
searching for a pair of vertical image edges within the image intensity data;
determining if the found pair of vertical image edges are located at about the same depth; and
determining if the vertical image edges that are located at about the same depth are the strongest pair of vertical image edges, with the strength of a pair being the sum of the pixel intensity differences multiplied by a penalty term that reflects the difference in depth; and
searching for the bottom of the target by searching lower rows of the image intensity data to find a dark-to-light transition.

8. A method of refining a vision system comprising:
obtaining image intensity data from a field of view, a depth map of objects within the field of view, and initial boundary information related to a target;
mapping the initial boundary information onto the image intensity data and onto the depth map;
searching near the mapped initial target boundary of the image intensity data and of the depth map to find vertical edges of the target;
searching near the mapped initial target boundary of the image intensity data and of the depth map to find the bottom of the target; and
searching near the mapped initial target boundary of the image intensity data and of the depth map to find the top of the target, wherein said searching for the top of the target comprises:
(a) searching a row of the mapped depth map data to determine whether a predetermined percentage of that row's depth measurements fall within a specified depth;
(b) storing the position of the row of step (a) if that row has the predetermined percentage of depth measurements that fall within a specified depth;
(c) searching the next higher row of the mapped depth map data to determine whether the predetermined percentage of that row's depth measurements fall within a specified depth;
(d) looping to step (b) if the row of step (c) has the predetermined percentage of depth measurements that fall within the specified depth; and
(e) identifying the highest row of the mapped depth map data that has the predetermined percentage of depth measurements that fall within the specified depth as the top of the target.

9. A method according to claim 8, further comprising using the mapped initial target boundary in the image intensity data and in the mapped depth map to refine the target's position.

10. A method according to claim 8, further comprising producing information related to the height and width of the target.

11. A method according to claim 8 wherein searching for the bottom of the target comprise searching lower rows of the mapped image intensity data to find a dark-to-light transition.

12. A method according to claim 11 wherein the bottom of the target is set at a predetermined position if a dark-to-light transition is not found.

13. A method according to claim 8 further comprising:
searching for the vertical edges by:
searching for a pair of vertical image edges within the mapped image intensity data;
determining if a found pair of vertical image edges are located at about the same depth; and determining if the vertical image edges that are located at about the same depth are the strongest pair of vertical image edges, with the strength of a pair being the sum of the pixel intensity differences multiplied by a penalty term that reflects the difference in depth; and searching for the bottom of the target by searching lower rows of the mapped image intensity data to find a dark-to-light transition.

14. A method of refining a vision system according to claim 8 wherein finding the top of the target comprises:

analyzing a bottom row of the mapped initial boundary information in the depth map data to determine whether a predetermined percentage of the bottom row's depth measurements fall within a predetermined specified region around the target's depth;

analyzing each consecutive higher row until the topmost row having the predetermined percentage of depth measurements that fall within the predetermined specified region around the target's depth is found; and relating that topmost row to the top of the target.

15. A method of refining a vision system according to claim 8 wherein finding the vertical edges of the target comprises searching near the mapped initial boundary information of the image intensity data to find vertical image edges that are located at about the same depth.

16. An apparatus for refining a vision system comprising:

means for obtaining image intensity data from a field of view, a depth map of objects within the field of view, initial boundary information related to a target, and system calibration parameters;

means for mapping the initial boundary information onto the image intensity data and onto the depth map; and means for determining from the mapped image intensity data and from the mapped depth map whether the specified portion of the initial target boundary is wholly within the field of view, said means for determining comprising means for searching to find top of the target comprising means for analyzing the bottom row of the mapped initial boundary information of the depth map data to determine whether a predetermined percentage of the bottom row's depth measurements fall within a predetermined specified region around the target's depth, means for analyzing each consecutive higher row until the topmost row having the predetermined percentage of depth measurements that fall within the predetermined specified region around the target's depth is found and means for relating the topmost row to the top of the target.

17. The apparatus according to claim 16, further comprising means for using the mapped initial target boundary of the image intensity data and of the depth map to refine information related to the target's position.

18. The apparatus of claim 16 wherein said means for determining further comprising means for searching to find bottom of the target.

19. The apparatus of claim 16 wherein said means for determining further comprising means for searching to find vertical edges of the target.

20. A method of refining a vision system comprising:

obtaining image intensity data of a field of view and a depth map of objects within the field of view;

determining if the image intensity data and the depth map include information related to a target;

searching for the top of the target in the image intensity data using information in the depth map, which is aligned to the image intensity data;

searching for the bottom of the target in the image intensity data using information in the depth map; and searching for vertical edges of the target in the image intensity data using information in the depth map; wherein said searching for the vertical edges of the target comprises searching for a pair of vertical image edges within the image intensity data, determining if the found pair of vertical image edges are located at about the same depth, and determining if the vertical image edges that are located at about the same depth are the strongest pair of vertical image edges, with the strength of a pair being the sum of the pixel intensity differences multiplied by a penalty term that reflects the difference in depth.

21. The method according to claim 20 wherein searching for the vertical edges further comprises determining if the vertical image edges that are located at about the same depth and that are the strongest pair of vertical image edges meet maximum and minimum strength constraints.

22. A method of refining a vision system comprising:

obtaining image intensity data from a field of view, a depth map of objects within the field of view, and initial boundary information related to a target;

mapping the initial boundary information onto the image intensity data and onto the depth map;

searching near the mapped initial target boundary of the image intensity data and of the depth map to find the top of the target;

searching near the mapped initial target boundary of the image intensity data and of the depth map to find the bottom of the target; and searching near the mapped initial target boundary of the image intensity data and of the depth map to find vertical edges of the target, wherein said searching for the vertical edges of the target comprise searching for a pair of vertical image edges within the mapped image intensity data, determining if a found pair of vertical image edges are located at about the same depth, and determining if the vertical image edges that are located at about the same depth are the strongest pair of vertical image edges, with the strength of a pair being the sum of the pixel intensity differences multiplied by a penalty term that reflects the difference in depth.

23. The method according to claim 22 wherein searching for the vertical edges further comprises determining if the vertical image edges that are located at about the same depth and that are the strongest pair of vertical image edges meet maximum and minimum strength constraints.

* * * * *